(12) United States Patent
Großpietsch et al.

(10) Patent No.: US 11,962,226 B2
(45) Date of Patent: Apr. 16, 2024

(54) ROTOR SUPPORT FOR AN ELECTRICAL MACHINE

(71) Applicant: ZF FRIEDRICHSHAFEN AG, Friedrichshafen (DE)

(72) Inventors: Wolfgang Großpietsch, Schweinfurt (DE); Angelika Ebert, Schonungen (DE); Monika Rößner, Donnersdorf (DE); Christoph Margraf, Markdorf (DE); Thomas Bauer, Großbardorf (DE)

(73) Assignee: ZF FRIEDRICHSHAFEN AG, Friedrichshafen (DE)

( * ) Notice: Subject to any disclaimer, the term of this patent is extended or adjusted under 35 U.S.C. 154(b) by 0 days.

(21) Appl. No.: 17/258,869

(22) PCT Filed: Jul. 8, 2019

(86) PCT No.: PCT/EP2019/068228
§ 371 (c)(1),
(2) Date: Jan. 8, 2021

(87) PCT Pub. No.: WO2020/011702
PCT Pub. Date: Jan. 16, 2020

(65) Prior Publication Data
US 2021/0328479 A1   Oct. 21, 2021

(30) Foreign Application Priority Data

Jul. 10, 2018   (DE) .................... 10 2018 211 374.2

(51) Int. Cl.
*H02K 7/108*   (2006.01)
*F16H 45/02*   (2006.01)
(Continued)

(52) U.S. Cl.
CPC .............. *H02K 7/108* (2013.01); *F16H 45/02* (2013.01); *H02K 7/006* (2013.01); *B60K 6/26* (2013.01);
(Continued)

(58) Field of Classification Search
CPC ...... B60K 6/26; B60K 6/387; B60Y 2200/92; B60Y 2400/424; B60Y 2400/426
(Continued)

(56) References Cited

U.S. PATENT DOCUMENTS 6,830,140 B2 * 12/2004  Zink .................. F16D 13/70
                                                192/110 S
8,556,010 B2 * 10/2013  Ebert ................. B60K 6/40
                                                180/65.25
(Continued)

FOREIGN PATENT DOCUMENTS

DE   102004055179   5/2006
DE   102009059944   7/2010
(Continued)

OTHER PUBLICATIONS

Office Action of the corresponding German Patent Application No. 10 2018 211 374.2.

*Primary Examiner* — Rashad H Johnson
(74) *Attorney, Agent, or Firm* — Cozen O'Connor

(57) ABSTRACT

A rotor carrier for a rotor of an electric machine and to a hybrid module with such a rotor carrier. The rotor carrier includes a tubular base body having elements on an outer circumferential surface facing the rotor for connection between base body and rotor, the base body is connected to a hub by a connection element. The connection element has (Continued)

an axial portion which extends along a part of the axial length of the base body and runs coaxial to the latter, in that receptacles for parts of a clutch are provided on an inner circumferential surface of the axial portion remote of the base body, and in that the connection element has a flange area adjoining the axial portion.

15 Claims, 5 Drawing Sheets

(51) Int. Cl.
*H02K 7/00* (2006.01)
*B60K 6/26* (2007.10)
*B60K 6/387* (2007.10)
*F16D 13/52* (2006.01)
*F16D 21/06* (2006.01)

(52) U.S. Cl.
CPC ........... *B60K 6/387* (2013.01); *B60Y 2200/92* (2013.01); *B60Y 2400/424* (2013.01); *B60Y 2400/426* (2013.01); *F16D 13/52* (2013.01); *F16D 21/06* (2013.01)

(58) Field of Classification Search
USPC ........................................ 310/75 R, 778, 112
See application file for complete search history.

(56) References Cited

U.S. PATENT DOCUMENTS

| 10,731,741 | B2* | 8/2020 | Frait ....................... B21K 1/762 |
| 2008/0093135 | A1* | 4/2008 | Nomura .................. B60L 58/40 903/906 |
| 2021/0126498 | A1* | 4/2021 | Großpietsch ............ B60K 6/38 |
| 2021/0268889 | A1* | 9/2021 | Großpietsch ............ B60K 6/26 |
| 2022/0219524 | A1* | 7/2022 | Binder ................... B60K 6/387 |
| 2022/0360146 | A1* | 11/2022 | Matschas ................. H02K 1/32 |
| 2023/0012163 | A1* | 1/2023 | Kim ....................... F16H 57/021 |
| 2023/0038832 | A1* | 2/2023 | Kim ........................ F16D 25/10 |

FOREIGN PATENT DOCUMENTS

| DE | 112005002200 | 4/2011 |
| DE | 102016215595 | 2/2018 |
| DE | 102016216651 | 3/2018 |
| WO | WO 2015018575 | 2/2015 |

* cited by examiner

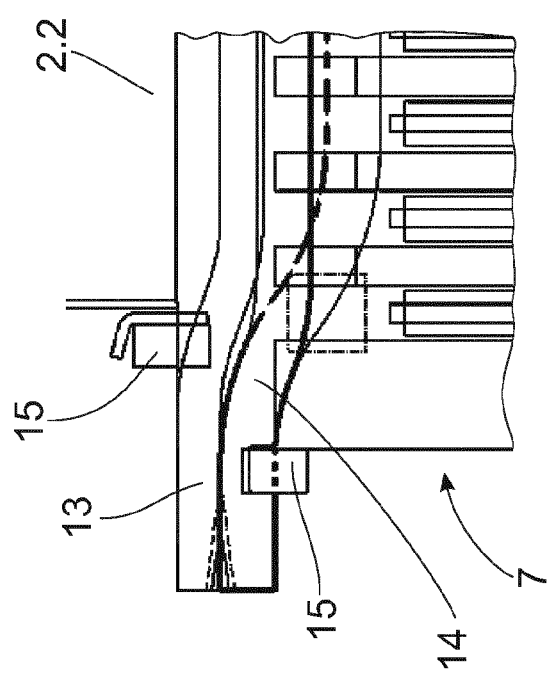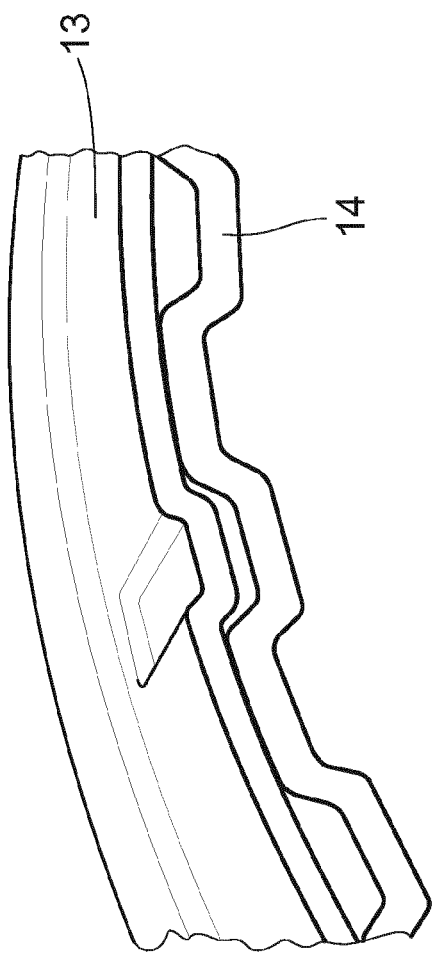

ROTOR SUPPORT FOR AN ELECTRICAL MACHINE

CROSS REFERENCE TO RELATED APPLICATIONS

This is a U.S. national stage of Application No. PCT/EP2019/068228 filed Jul. 8, 2019. Priority is claimed on German Application No. DE 10 2018 211 374.2 filed Jul. 10, 2018 the content of which is incorporated herein by reference.

BACKGROUND OF THE INVENTION

1. Field of the Invention

The invention is directed to a rotor carrier for an electric machine, particularly in a hybrid powertrain of a vehicle.

2. Description of Related Art

Besides solid rotors, annular rotors, which are arranged around an axis of rotation, are known in the prior art in electric machines. It is known, for example, from DE 10 2016 215 595 A1 that a lamination stack of a rotor is received on a sleeve and the sleeve is connected at one end to the rotational axis.

SUMMARY OF THE INVENTION

It is the object of one aspect of the invention to provide an alternative to the prior art which has a better support of the rotor, makes optimal use of installation space, and is also simple and economical to produce.

According to one aspect of the invention, a rotor carrier for a rotor of an electric machine comprises a tubular base body, the base body has elements on an outer circumferential surface facing the rotor which make possible a positive engagement connection and/or frictional engagement connection between the base body and rotor, and the base body is connected to a hub by a connection element. The rotor carrier is characterized in that the connection element has an axial portion which extends along a part of the axial length of the base body and runs coaxial to the latter, in that receptacles for parts of a clutch are provided on an inner circumferential surface of the axial portion remote of the base body, and in that the connection element has a flange area adjoining the axial portion. A profiling, for example, is provided at the base body for the connection between the base body and the rotor with which projections and/or recesses are provided at least on the outer circumferential surface, which projections and/or recesses cooperate with corresponding mating pieces on the inner surface of the rotor in order to produce a positive engagement connection. Alternatively or cumulatively, projections or recesses can also be provided in circumferential direction such as steps or annular grooves which are usable for a positive engagement connection or frictional engagement connection. A frictional engagement connection in which the rotor is connected to the base body via clamping elements, screws, rivets or the like can also be provided instead of a positive engagement connection. Material bond connections in which the rotor is welded to the base body are also possible in principle. Combinations in which different types of connections are used, for example, to form or secure connections in different directions, are also possible.

The base body is connected to a hub by a connection element in order to be able to transmit a torque. In this context, the term "hub" means and comprehends not only a conventional hub mounted on a shaft but also a direct connection to a shaft or also the connection to a component part downstream in the powertrain, for example, a converter housing. The connection to the hub is carried out via a flange area of the connection element correspondingly shaped in radial direction.

Receptacles for parts of a clutch are provided at the inner circumferential surface of the axial portion of the connection element which runs coaxial to the base body. These parts are preferably grooves or projections in axial direction that serve to receive plates of a multiple-plate clutch. Accordingly, the connection element is simultaneously the outer plate carrier of a clutch. The clutch can interrupt a flow of power from or to an internal combustion engine located upstream in the powertrain, for example.

Embodiment forms of a rotor carrier are characterized in that the axial portion of the connection element has an axial length in the range of from 25% to 75% of the axial length of the base body. The coaxial region of the connection element is formed shorter than the base body. In this way, on the one hand, the flange area can be positioned closer to the center of the rotor viewed in axial direction so that the power flow and the loading of the connection element can be reduced. On the other hand, axial installation space can be saved overall in this way because component parts downstream of an output shaft can be provided at least partially inside of the rotor projecting over the connection element.

The length of the axial portion should be in the range of from one fourth to three fourths, i.e., 25% to 75%, of the length of the base body. Accordingly, the flange area can be positioned far enough toward the center of the rotor and there is sufficient space for receiving the parts of the clutch. A secure connection to the base body can likewise be produced.

A further advantageous aspect consists in that possibly identical connection elements can be used for different base bodies of different rotors, which is advantageous with respect to manufacturing and costs. This effect similarly applies to the base body, since different connection elements can possibly be used for installing identical base bodies depending on the powertrain.

Rotor carriers according to one aspect of the invention are characterized in that the connection element has a connecting area at the axial end opposite the flange area, and in that the connecting area is connected to the base body. The connecting area can be formed by a front side, by a collar formed on the outer side or on the inner side, or by an edge area of the outer circumferential surface. Correspondingly, the connecting area can be brought into contact with a corresponding area of the base body such as a step, a front side, an internally or externally formed collar or an area of the inner circumferential surface and connected thereto, preferably by welding or riveting.

The connecting area is provided adjacent to the axial portion but can also be arranged, for example, so as to overlap the latter, e.g., as circumferential surface.

Preferred embodiment forms of a rotor carrier are characterized in that the connecting area is connected to an axial end of the base body and in that the axial portion extends coaxially inside the base body. Arrangement at the axial end facilitates the positioning and production of the connection. A coaxiality can also improve the stability of the connection element.

Embodiment forms of a rotor carrier are characterized in that the axial portion abuts the base body. The stability of the rotor carrier can be further improved by a contact between the connection element and base body along the axial portion. Further, the contact area can be utilized in addition as connecting area or as part of the connecting area.

Rotor carriers according to one aspect of the invention are characterized in that the base body and/or the connection element has, at least in one location along the axial extension, a cross section that is changed in radial direction in order to form a stop for positioning the base body and the connection element relative to one another. In order to allow the position to be secured simply and quickly when assembling the base body and connection element, the use of circumferential steps or cantilevers is advantageous because the latter can form stops in axial direction against which the corresponding mating piece can be pushed.

Embodiment forms of a rotor carrier are characterized in that the connection between the base body and the connection element is carried out by positive engagement in at least one direction. For example, a positive engagement connection can be produced between the base body and the connection element by the above-mentioned steps or profiling of the cross section. For producing from sheet metal or tubular portions, a relatively consistent wall thickness can be preserved when a recess is provided on the inner surface, for example, at a location on the circumference with a projection on the outer surface. In addition to economizing on weight, reduced manufacturing costs are also achieved compared to a cutting machining of a solid blank.

Embodiment forms of a rotor carrier are characterized in that the connection between the base body and the connection element is carried out by material bond in at least one direction. After the base body and the connection element have been positioned relative to one another, the parts are advantageously welded together so that a fixed, simple and inexpensively producible connection is achieved.

Preferred embodiment forms of a rotor carrier are characterized in that a weld seam between the base body and connection element runs coaxially between two circumferential surfaces or between two end faces. The weld seam runs along the contact surfaces between the base body and connection element or connecting area of the connection element. The weld seams can run either along adjacent front sides at an axial end or along a circumferential surface at the inner or outer circumference depending on the configuration of the component parts. It is also possible, especially in case of overlapping areas, that the weld seam is formed by a plurality of spot welds distributed over the circumference.

Embodiment forms of a rotor carrier are characterized in that the flange area is directly connected to a converter housing or in that the flange area extends in radial direction and is connected to a hub. In a powertrain with a torque converter downstream, the connection element, more precisely, the flange area, can be directly connected to the converter housing given an appropriate configuration of the converter housing. The connection can preferably be carried out at a circumferential surface of the converter housing so that the flange area can be constructed short and extensive conservation of axial installation space can be achieved. However, connecting to a circumferential surface of the converter housing requires a heavy expenditure on manufacturing and assembly. It is also possible to construct the flange area longer so that it extends farther inward in radial direction. The flange area can then be connected, for example, to a front wall of the converter housing or also to a separately formed hub. When connecting to the front side of the converter housing, the axial installation space requirement can be minimized and a relatively simple assembly can be carried out at the same time. On the other hand, by a separate hub which is pushed onto an output shaft, simple component assemblies can be provided and mounted and, as the case may be, a standardization can be improved because any standardized rotor carriers can be connected to any other likewise standardized component parts via the model-dependent hub.

Rotor carriers according to embodiment forms are characterized in that the base body and/or the connection element is formed longer than the rotor at least at one axial end. The length refers in this regard particularly to the length of the lamination stack of the rotor. By a rotor carrier protruding over the rotor, the positioning of the component parts by steps, cantilevers and the like can be improved on the one hand and cooling can be improved on the other hand when correspondingly configured. Further, a certain mechanical protection of the rotor is afforded by the protruding rotor carrier, more precisely, the protruding base body and/or connection element. The protruding rotor carrier can also be used in particular for balancing the rotor by fixing balancing weights to the protruding rotor carrier or by local removal of material.

Embodiment forms of a rotor carrier are characterized in that the base body and/or the connection element has at least one cutout that is continuous in radial direction for the passage of oil. At least one cutout is provided in order to guide oil from the inner side to the outer side for lubrication and cooling. This cutout is preferably arranged in the area of an axial end of the lamination stack or so as to lead into an oil channel formed between the rotor carrier and the lamination stack.

Preferred embodiment forms of a rotor carrier are characterized in that a plurality of cutouts are arranged so as to be distributed over the circumference. For a more uniform distribution of the oil and in order to prevent unbalance, a plurality of cutouts are distributed, preferably symmetrically, over the circumference. In this regard, a plurality of cutouts can also be provided at different axial positions so that the cooling can be improved on both sides, for example. In addition to the cutouts, guiding elements can also be provided at the connection element or base body in order to guide oil impinging from the inside to the cutouts or to selectively deliver oil outward. These guiding elements can be constructed as channels, annular grooves or recesses inclined toward the cutouts or can also be constructed in a raised manner as struts, projections or steps. These guiding elements can possibly serve at the same time as receptacles for the parts of a clutch or can be used for producing a positive engagement connection between the connection element and base body.

Embodiment forms of a rotor carrier are characterized in that the base body is produced from a reformed tubular portion. Since the basic shape of the base body is given in case of a tubular portion, a base body can advantageously be produced from a tubular portion which is shaped by corresponding reforming steps and/or machining steps to form a base body. Alternatively, the base body can also be shaped from a sheet metal.

Embodiment forms of a rotor carrier are characterized in the connection element is produced from a reformed sheet metal. The connection element with connecting area and flange area can advantageously be produced from a sheet metal by corresponding reforming processes, pressing processes or continuous flow forming processes.

A further aspect of the invention is a hybrid module comprising an input shaft, a clutch, an electric machine, a torque converter and an output shaft, which is characterized in that a rotor carrier is provided according to one of the embodiment forms described above. Accordingly, the above-described advantages with respect to axial installation space and the like can be utilized in a hybrid module.

The embodiment forms are not limited to the examples given above and may be achieved through further corresponding constructions. The features of the embodiment forms may be combined in any desired manner.

BRIEF DESCRIPTION OF THE DRAWINGS

The invention will be described in more detail in the following referring to drawings. Like or similar elements are designated by consistent reference numerals. The drawings show:

FIG. 3 is an enlarged subarea from FIG. 2;

FIG. 4 is a detail of a base body with a connection element;

DETAILED DESCRIPTION OF THE PRESENTLY PREFERRED EMBODIMENTS

Figure 1:
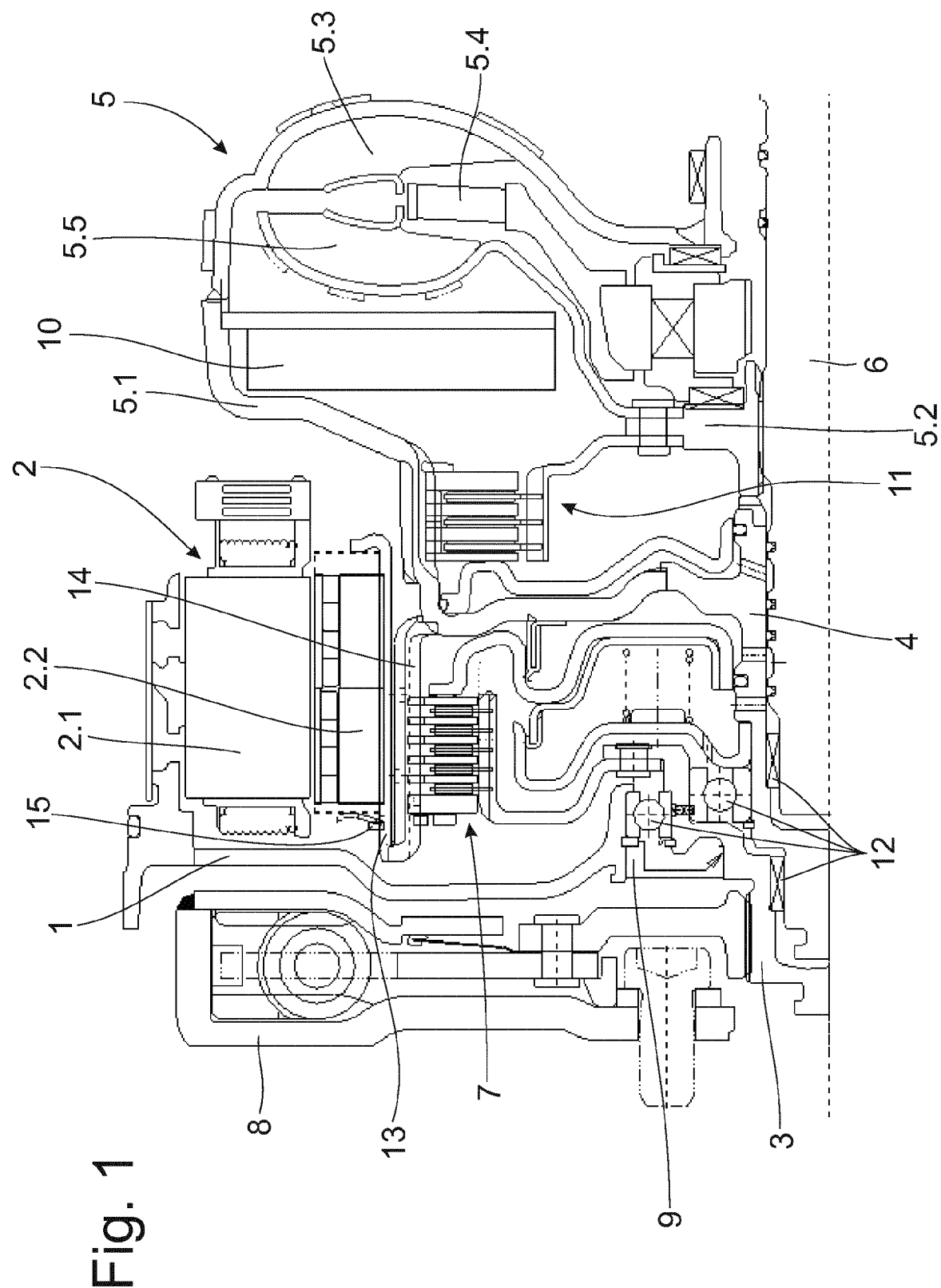
FIG. 1 is a schematic section of a hybrid module.

FIG. 1 shows a hybrid module according to an embodiment example in a schematic sectional view, one half of which has been omitted in view of symmetry. The hybrid module comprises a housing 1 within which is arranged an electric machine 2 with a stator 2.1, which is fixed with respect to rotation relative to the housing 1, and a rotatable rotor 2.2.

The hybrid module has a torque converter 5. The converter housing 5.1 is connected to a hub 4. An impeller 5.3 of the torque converter 5 is fixedly connected to a converter housing 5.1 of the torque converter 5. A stator wheel 5.4 of the torque converter 5 is supported so as to be fixed with respect to relative rotation in one rotational direction via a freewheel. A turbine wheel 5.5 of the torque converter 5 is connected to a turbine shaft 5.2 of the torque converter 5. The hybrid module further has an additional, optional torsional vibration mass damper 10 which is arranged within and on the converter housing 5.1. The turbine shaft 5.2 is connected to an output shaft 6 of an automatic transmission, not shown in more detail. Further, a lockup clutch 11 is arranged inside of the converter housing 5.1. The converter housing 5.1 is directly connectable to the turbine shaft 5.2 by engaging the lockup clutch 11.

The hub 4 is formed as a hollow shaft arranged coaxial to the output shaft 6 and so as to enclose the latter. In the depicted example, the input shaft 3 is likewise constructed as a hollow shaft and is arranged coaxial to the hub 4. A plurality of bearings 12 are arranged between the output shaft 6 and the hub 4, between the hub 4 and the input shaft 3 and between the input shaft 3 and the housing 1 and support the component parts relative to one another. The hub 4 is connected on its outer side to the converter housing 5.1 and to one side of the clutch 7.

A vibration damper 8, which is connected to an internal combustion engine, not shown, is provided on the input shaft 3. Possible torsional vibrations are reduced by the vibration damper 8 in order to supply the hybrid module with a torque or rotational movement, which is as uniform as possible. At the same time, positional tolerances and alignment tolerances between the internal combustion engine and the hybrid module can be compensated by the vibration damper 8.

The housing 1 separates a wet space of the hybrid module from a dry space. The wet space is sealed relative to the dry space by a seal 9 arranged preferably directly adjacent to a bearing 12.

A clutch 7 by which the internal combustion engine can be disconnected from the rest of the powertrain is also provided inside the housing 1. To this end, the clutch 7 is arranged in the power flow between the input shaft 3 and the hub 4. More precisely, the parts of the clutch 7 are correspondingly connected to the input shaft 3 and to a rotor carrier. In the depicted embodiment example, the clutch 7 is constructed as a multiple-plate clutch.

The rotor 2.2 of the electric machine 2 is connected to a base body 13 of the rotor carrier. The base body 13 has a tubular body, the rotor 2.2 being mounted on the outer circumferential surface thereof. In the depicted embodiment example, the axial end of the base body 13 facing the torque converter 5 is reformed outward to form a collar which partially overlaps the rotor 2.2 in radial direction. Therefore, the collar offers a protection of the rotor 2.2 and can be used as a stop for positioning the rotor 2.2. By corresponding cutouts or balancing elements, not shown, the collar can also be used to guide oil for lubrication and cooling of the electric machine 2 or for balancing the electric machine 2, respectively. The opposite axial end of the base body 13 is constructed flat so as to be flush with the outer circumferential surface to allow the rotor 2.2 to be mounted. In order to secure the axial position of the rotor 2.2 on the base body 13, a retaining element 15 is provided in a groove. The retaining element 15 can be constructed such that it is at least partially elastic in order to compensate for manufacturing tolerances and the like.

The rotor carrier comprises a connection element 14 in addition to the base body 13. In the depicted embodiment example, the connection element 14 is likewise formed substantially tubular. An axial portion of the connection element 14, which extends coaxial to the base body 13, is provided with a profiling in order to form projections and recesses in the manner of a spline which are distributed over the circumference. These projections and recesses serve to receive parts of the clutch 7—the outer plates of the clutch 7 in the depicted example—so that the connection element 14 constitutes the outer plate carrier of the clutch 7. In order to form a connecting area for connecting to the base body 13, the axial end of the connection element 14 facing the internal combustion engine is reformed outward in radial direction and forms a cantilever. The outer circumferential surface of the connecting area is fixedly connected, preferably by welding, to the inner circumferential surface of the base body 13. However, a cantilever is likewise provided radially inward at the opposite axial end of the connection element 14 facing the torque converter 5 so as to form a flange area. The flange area is constructed relatively short in the depicted embodiment example, which improves the stability of the connection element 14, and is directly connected to the converter housing 5.1. The connection to the converter housing 5.1 can also be carried out in addition to the depicted connection in the area of the edge at a circumferential surface or an end face of the torque converter 5 depending on the geometry of the component parts.

Figure 2:
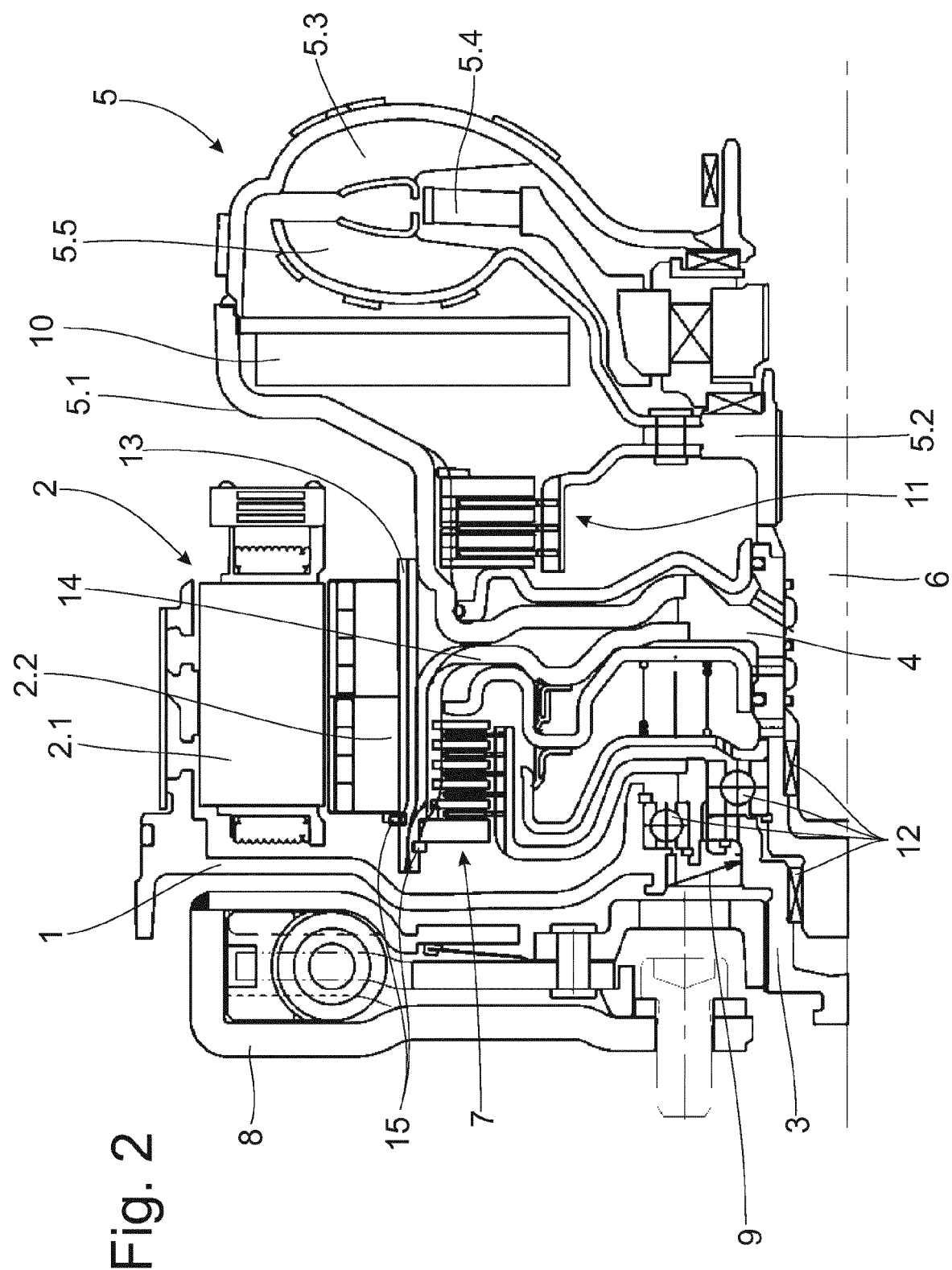
FIG. 2 is a schematic section of a hybrid module.

FIG. 2 shows a further embodiment example of a hybrid module according to the invention similar to FIG. 1. The basic construction is the same so that the preceding description may be referred to.

Contrary to the example from FIG. 1, the connection element 14 is not mounted directly at the converter housing 5.1 but rather is connected to the hub 4 to which the converter housing 5.1 is also connected. For this purpose, the flange area is constructed with a larger radial extension so that the connection element 14 has a pot-like shape.

The axial portion of the connection element 14 is formed at the inner circumferential surface as outer plate carrier of the clutch 7 similar to FIG. 1. In this embodiment example, the outer circumferential surface of the connection element 14 virtually abuts an inner circumferential surface of the base body 13.

The connecting area of the connection element 14 is formed by a coaxially and radially outwardly offset area which is fixedly connected to an area of the base body 13 protruding axially over the rotor 2.2.

Projections and recesses, in this case in the form of axially extending grooves, are provided at the base body 13 for receiving and fastening the rotor 2.2 on the outer circumferential surface. Retaining elements 15 are provided, respectively, for the axial positioning of the rotor 2.2 on the base body 13 and the parts of the clutch on the connection element 14.

The connecting area of the connection element 14 to the base body 13 is shown in an enlarged manner in FIG. 3. In the connection element 14, the recesses and projections are constructed as receptacle of parts of the clutch 7 by a corresponding profiling of the sheet metal type material for the connection element 14. Accordingly, the connection element 14 has a constant wall thickness along the circumference. In the case of the base body 13, the grooves can also be produced by a profiling. However, in the depicted embodiment example, the grooves are introduced in a solid base body 13, for example, by cutting machining, so that the base body 13 has a constant inner diameter in the area of the rotor 2.2, and the wall thickness correspondingly changes over the circumference. Circumferential annular grooves for retaining elements 15 are provided in the base body 13 and in the connection element 14 for limiting in axial direction.

The connection element 14 has an increased diameter without profiling in the axial end area formed as connecting area. This connecting area adjoins a corresponding axially extending area of the base body 13 and is connected to the latter. The connection is preferably carried out via a weld along the common end face. Alternatively or additionally, the connection between the base body 13 and the connection element 14 can also be produced in the adjoining connecting area by riveting, clinching, spot welding, or other planar connection methods.

FIG. 4 shows a perspective view of a subarea of a base body 13 and of a connection element 14. In this case, the connection element 14 is likewise profiled over the circumference in order to form projections and recesses for receiving parts of the clutch 7. This profiling extends through to the connecting area. In order to achieve a positive engagement connection especially in circumferential direction, the base body 13 has an embossment which, in radial direction, corresponds to a recess at the outer circumference of the connection element 14 and engages therein. Depending on the rest of the geometry and on loads, a further fastening can preferably be provided particularly in axial direction by one of the connection types already mentioned referring to FIG. 3.

Figure 5:
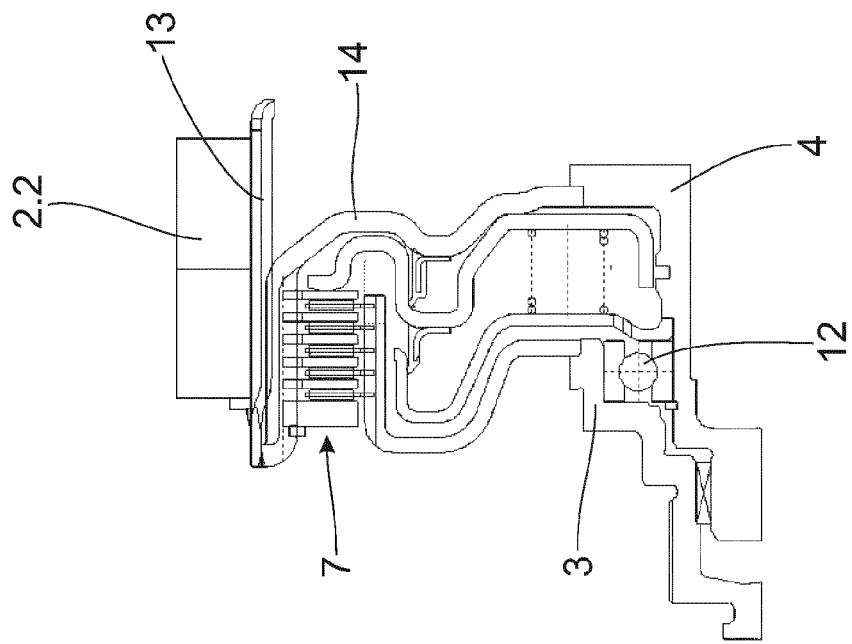
FIG. 5 is a subarea of a schematic section of a hybrid module in the area of the rotor.
Figure 6:
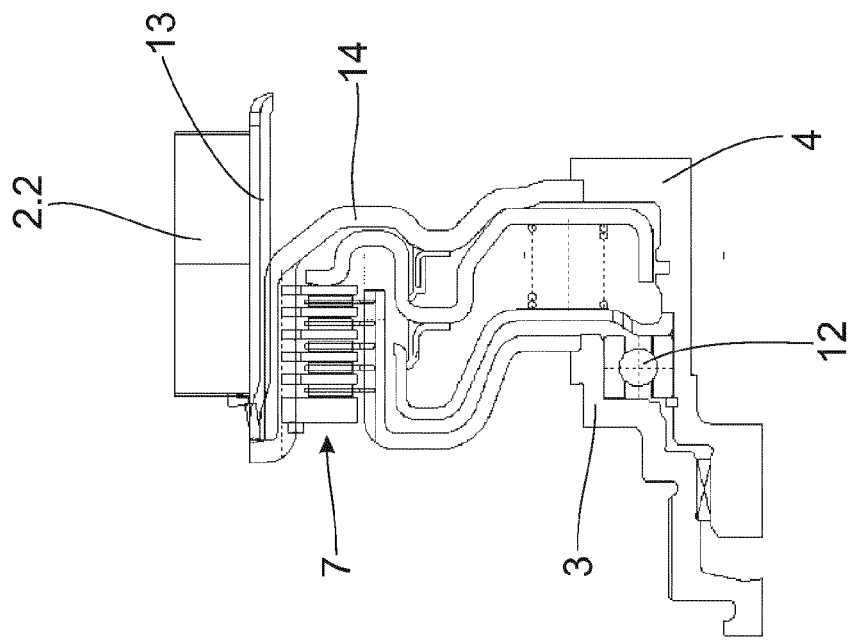
FIG. 6 is a subarea of a schematic section of a hybrid module in the area of the rotor.
Figure 7:
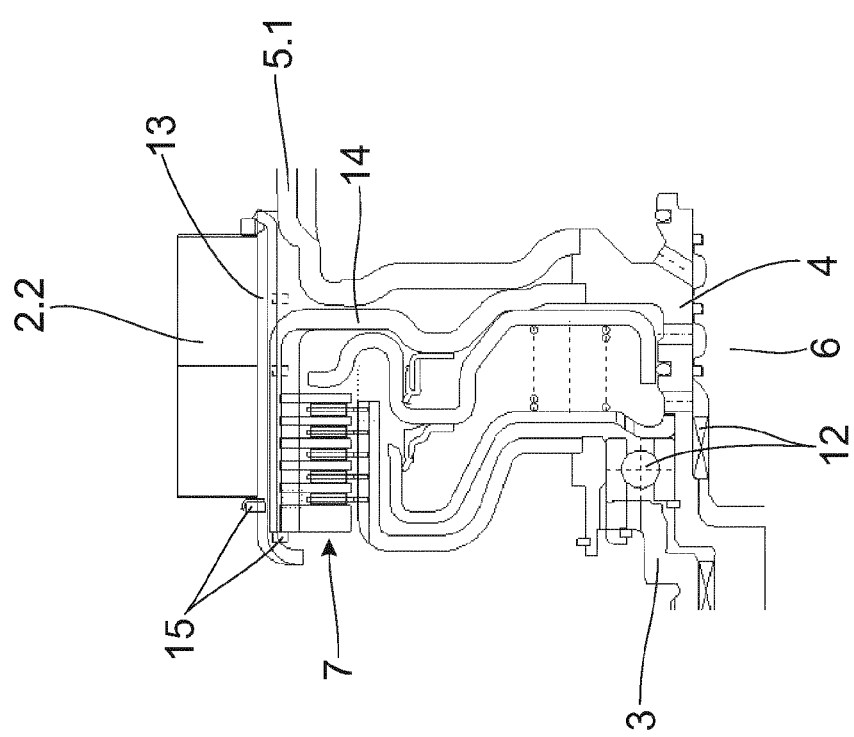
FIG. 7 is a subarea of a schematic section of a hybrid module in the area of the rotor.

FIG. 5, FIG. 6, and FIG. 7 each show a subarea of a hybrid module in the region of the clutch similar to FIG. 1 and FIG. 2 for different embodiment examples. FIGS. 5 to 7 have in common that an input shaft 3 is connected to a clutch 7, more precisely, the input side thereof. Parts of the clutch, more precisely, the output side, are connected to a connection element 14 which also forms the outer plate carrier. The connection element 14 is connected to the hub 4 and accordingly to the rest of the powertrain. Further, the connection element 14 is connected to a base body 13, and the base body 13 receives a rotor 2.2 on an outer circumferential surface. Accordingly, the connection element 14 and the base body 13 together form the rotor carrier.

In the embodiment examples of FIG. 5, FIG. 6, and FIG. 7, both the base body 13 and the connection element 14 are provided with a profiling in order to produce a positive engagement connection at least in circumferential direction. Differences between the embodiment examples consist, above all, in the further configuration of the depicted connection elements 14 and base body 13.

The connecting area of the connection element 14 is reformed radially outward in FIG. 5 to form a collar. An axial end face of the base body 13 abuts an axial end face of the collar of the connection element 14, and these end faces are welded together so that the weld seam runs radially.

FIG. 6 is basically identical to FIG. 5, wherein the collar of the connection element 14 is constructed shorter and the outer circumferential surface of the collar of the connection element 14 abuts an inner circumferential surface of the base body 13. These circumferential surfaces are welded to one another. Accordingly, the weld seam runs axially.

Instead of end faces or circumferential surfaces, other pairings of contact surfaces are also possible in principle in which, for example, the weld seam runs diagonally or contact surfaces disposed at an angle relative to one another are welded with a fillet weld.

In addition to a connection in the connecting area of the connection element 14, connections, not shown, can be carried out additionally along the axial portion when the latter contacts the base body. The additional connections can be carried out particularly by spot welds, riveting or clinching.

In the embodiment example in FIG. 7, the base body has an inwardly directed collar at its axial end remote of the converter housing 5.1. A retaining element 15, which serves as axial stop for the connection element 14, is received adjacent to this collar. The base body 13 also has retaining elements 15 on the outer side for axially positioning the rotor 2.2.

The invention is not limited to the embodiments described herein. As has already been stated, only individual advantageous features can also be provided, or various features from different examples may be combined with one another.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

The invention claimed is:

1. A rotor carrier for a rotor of an electric machine, comprising:
   a tubular base body having, on an outer circumferential surface facing the rotor, engagement elements configured for a positive engagement connection and/or a frictional engagement connection between the tubular base body and the rotor; and
   a connection element that connects the tubular base body to a hub, comprising:
   an axial portion which extends along a part of an axial length of the tubular base body and runs coaxial to the tubular base body;
   receptacles for parts of a clutch are defined on an inner circumferential surface of the axial portion remote of the tubular base body; and
   a flange area adjoining the axial portion,
   wherein the tubular base body is connected to the axial portion.

2. The rotor carrier according to claim 1, wherein the axial portion of the connection element has an axial length in a range of from 25% to 75% of the axial length of the tubular base body.

3. The rotor carrier according to claim 1, wherein the connection element has a connecting area at an axial end opposite the flange area, and the connecting area is connected to the tubular base body.

4. The rotor carrier according to claim 3, wherein the connecting area is connected to an axial end of the tubular base body, and the axial portion extends coaxially inside the tubular base body.

5. The rotor carrier according to claim 1, wherein the axial portion abuts the tubular base body.

6. The rotor carrier according to claim 1, wherein the tubular base body and/or the connection element has, at least in one location along a respective axial extension, a cross section which is changed in radial direction to form a stop configured to position the tubular base body and the connection element relative to one another.

7. The rotor carrier according to claim 1, wherein the connection between the tubular base body and connection element is carried out by positive engagement in at least one direction.

8. The rotor carrier according to claim 1, wherein the connection between the tubular base body and connection element is carried out by material bond in at least one direction.

9. The rotor carrier according to claim 8, further comprising:
   a weld seam between tubular base body and connection element that runs coaxially between two circumferential surfaces or between two end faces.

10. The rotor carrier according to claim 1, wherein the flange area is one of:
    directly connected to a converter housing, or
    extends in a radial direction and is connected to the hub.

11. The rotor carrier according to claim 1, wherein the tubular base body and/or the connection element is formed longer than the rotor at least at one axial end.

12. The rotor carrier according to claim 1, wherein the tubular base body is produced from a reformed tubular portion.

13. The rotor carrier according to claim 1, wherein the connection element is produced from a reformed sheet metal.

14. A hybrid module comprising:
    an input shaft;
    a clutch;
    an electric machine;
    a torque converter; an output shaft; and
    a rotor carrier comprising:
    a tubular base body having, on an outer circumferential surface facing a rotor, engagement elements configured for a positive engagement connection and/or a frictional engagement connection between the tubular base body and the rotor; and
    a connection element that connects the tubular base body to a hub, comprising:
    an axial portion which extends along a part of an axial length of the tubular base body and runs coaxial to the tubular base body;
    receptacles for parts of the clutch are defined on an inner circumferential surface of the axial portion remote of the tubular base body; and
    a flange area adjoining the axial portion,
    wherein the tubular base body is connected to the axial portion.

15. The rotor carrier according to claim 1, wherein the tubular base body is directly connected to the axial portion.

* * * * *